Oct. 27, 1953 R. K. LOCKHART 2,657,332

SIZE CONTROL FOR CATHODE-RAY TUBE DEFLECTION CIRCUITS

Filed Jan. 29, 1949 2 Sheets-Sheet 1

INVENTOR
Robert K. Lockhart
BY
[signature]
ATTORNEY

SIZE CONTROL FOR CATHODE-RAY TUBE DEFLECTION CIRCUITS

Filed Jan. 29, 1949 2 Sheets-Sheet 2

INVENTOR
Robert K. Lockhart
BY
[signature]
ATTORNEY

Patented Oct. 27, 1953 2,657,332

UNITED STATES PATENT OFFICE 2,657,332

SIZE CONTROL FOR CATHODE-RAY TUBE DEFLECTION CIRCUITS

Robert K. Lockhart, Collingswood, N. J., assignor to Radio Corporation of America, a corporation of Delaware Application January 29, 1949, Serial No. 73,648

8 Claims. (Cl. 315—27)

The present invention relates to size control systems for cathode ray tube sweep or deflection circuits and more particularly, but not necessarily exclusively, to novel size control systems in which there is substantially no variation of linearity with size change and which are independent of and do not affect an associated generator of a deflection waveform.

It will, therefore, be seen that two important objects of the present invention are to provide a size control for a cathode ray tube deflection system which maintains the desired linear waveform of the sweep or deflection voltage or current and which also does not react in any way upon the generator of the deflection waveform, particularly with respect to the frequency of operation of the generator.

The system of the present invention in the several embodiments disclosed herein includes a wave comparison arrangement for automatically maintaining a desired waveform, and the novel size control of the present invention is associated with the wave comparison arrangement in a novel way so that, with a given linear input wave, the amplitude of the wave may be changed while maintaining the desired linear waveform for deflection. The input wave which is to be reproduced by the wave comparison arrangement may remain at substantially constant amplitude, and where it is not necessary to vary the amplitude of the input wave, it may be obtained with the desired and predetermined degree of linearity. In known systems when it is necessary to change the amplitude of the input wave, there is an inherent variation of linearity with size change which, while small, is still noticeable upon the screen of a cathode ray tube. If a blocking oscillator somewhat of the type disclosed in Patent No. 2,101,520, granted December 7, 1937, to W. A. Tolson and Tolson reissue patent Re. 20,338, dated April 30, 1937, is employed as the source of the sawtooth waveform ultimately to be used for deflection purposes, the size control will also have an effect upon the blocking oscillator frequency or speed which requires a simultaneous adjustment or synchronization of "hold" controls. With a size control embodying features of the present invention, linearity not noticeably affected even with close measurement. Frequency or speed is not changed since the sawtooth forming circuit conditions are not changed in any manner.

A further object of the invention is to provide a system for deriving and employing a differential signal which is effective in accordance with the invention for maintaining the desired waveform of an output signal and for changing the amplitude of the output signal.

A still further object of the invention is to provide a novel arrangement for obtaining size control in the deflection circuits associated with a cathode ray tube.

Other objects and advantages of the invention will, of course become apparent and immediately suggest themselves to those skilled in the art to which the invention is directed from a reading of the following specification in connection with the accompanying drawings in which.

Figure 1:
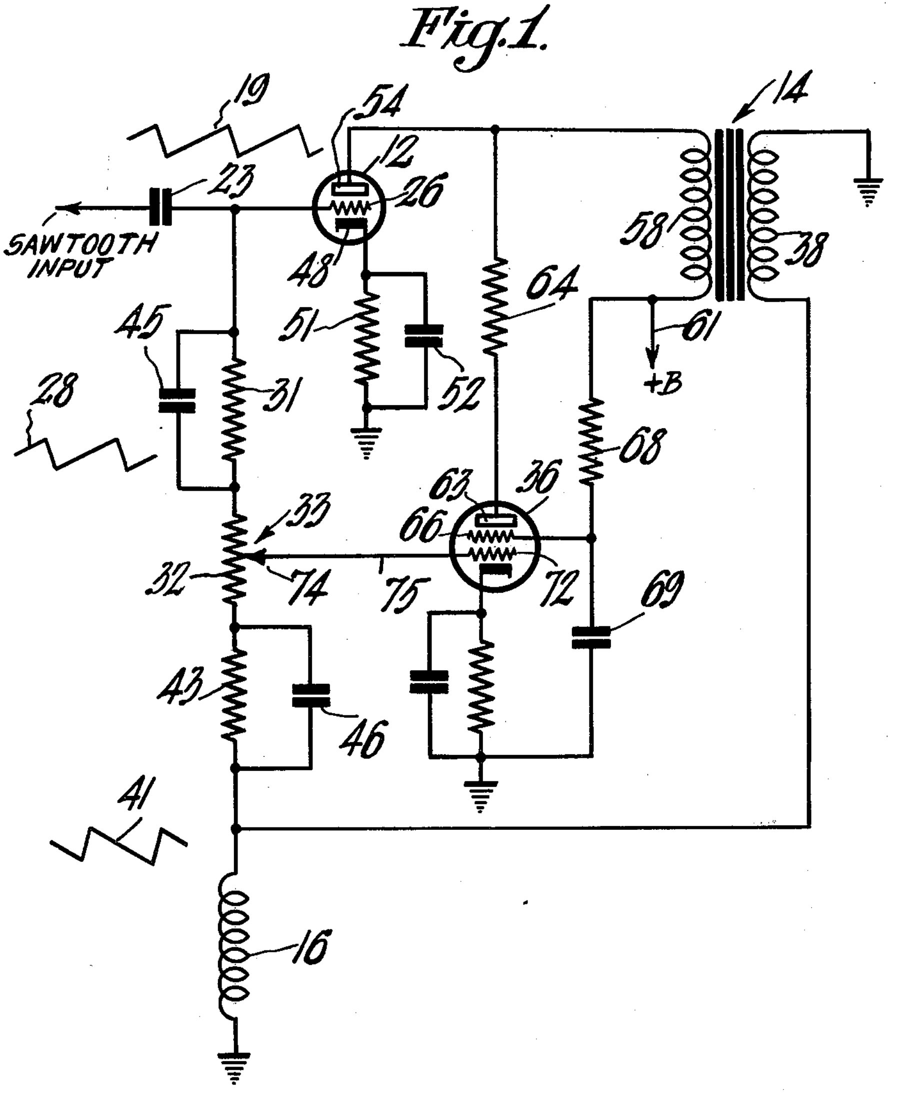
Fig. 1 shows, diagrammatically, cathode ray beam deflecting apparatus embodying the invention.

Referring for the present to Fig. 1 of the drawing, there is shown, by way of example, a deflection circuit for deflecting the cathode ray beam of a cathode ray tube (not shown) along one axis, for example, the vertical axis. Another similar deflection circuit (not shown) may be employed to produce deflection along an axis at right angles to the first axis thereby to produce a scanning raster in a well-known manner. Arrangements, generally similar to that shown herein, by way of example, are disclosed in the Tolson patents, No. 2,101,520 and No. Re. 20,338, referred to above.

The deflection circuit selected, by way of example, as a convenient setting for the present invention, although the invention is not limited in use to circuits of this type, comprises a power tube 12, a deflection transformer 14, and deflection coils 16. The coils 16 may be incorporated in a deflection yoke for use with a cathode ray tube (neither shown).

A sawtooth wave generator (not shown) of any suitable kind or type generates a sawtooth wave voltage which serves to drive the deflection system shown schematically by Fig. 1 of the drawing. The voltage wave supplied from the sawtooth wave source is shown conventionally and is designated by reference character 19. This wave 19 is applied through a coupling condenser 23 to the grid 26 of the power tube 12. A portion of the sawtooth wave 19, shown conventionally and indicated by reference character 28 is applied through a resistor 31 to the resistor 32 of a potentiometer 33. The resistor 31 and the potentiometer 33 are effectively in the return circuit for the grid 26 of the tube 12. These elements will be referred to hereinafter in detail in connection with the operation of a mixing or control tube 36. The waveform 19 which is applied to the grid 26 is suitable for the purpose of driving a sawtooth of current through the deflection coils 16 which are connected to the secondary 38 of the deflection transformer 14. In the foregoing the waveform 19 is assumed to be a sawtooth voltage. However, it will be understood that this wave may take other forms depending on the amount of inductance on the circuit particularly with respect to the plate resistance of the tube 12. Normally, for high frequency deflection a sawtooth 19 will drive a sawtooth of current through the deflection coils 16. Irrespective of the waveform developed for application to the grid 26, this wave serves as a comparison standard so that the deflection wave is made to conform therewith while its amplitude is varied in accordance with the invention.

A comparison wave 41 is obtained from the deflection coil 16 which is substantially a replica of the waveform of the deflection current and, therefore, contains any irregularities or departures of deflection waveform from the desired waveform. The waveform 41 is applied through a resistor 43 to the end of the potentiometer 33 opposite to the resistor 31. The resistors 31 and 43 are shunted by condensers 45 and 46 respectively to avoid slow-down of the retrace. They serve to compensate the balancing network for the higher frequencies of the return trace in a manner by now well known to those skilled in the art.

As mentioned above, the returned circuit for the grid 26 is through the resistors 31, 32, 43 and the transformer secondary 38 together with the deflection coil 16. The cathode 48 of the tube 12 is connected to a reference point, such as ground, through a cathode resistor 51. This resistor is shunted by a condenser 52 in the usual manner so that a bias is provided for the grid 26 without an undue amount of cathode degeneration.

The anode 54 of the tube 12 is connected in the usual manner through the primary 58 of the transformer 14 to a suitable source (not shown) of plate voltage as indicated schematically at 61.

The anode 63 of the previously mentioned control tube 36 is connected through a resistor 64 to the anode 54 of the tube 12. The tubes 12 and 36 may be considered as being connected in parallel for certain purposes to be described. The screen grid 66 of the tube 36 is connected through a resistor 68 to the above mentioned source of positive voltage as indicated at reference character 61. By-pass condenser 69 to ground is provided for the screen grid of this tube.

The control grid 72 of the tube 36 is connected to the slider 74 of the previously mentioned potentiometer 33 by way of a physical conductor 75. It is to be noted at this point that with the slider 74 at the electrical mid-point of the resistor 32, if the amplitudes of the waves 28 and 41 differ, the halves of the resistor 32 will have voltage values inversely proportional to the amplitude of the respective wave. If the waveforms 28 and 41 are equal, the potential at the slider 74 will remain substantially fixed and the plate current of the tube 36 will remain substantially in a steady state condition. If the waveform shown conventionally as indicated by the reference character 41 changes with respect to the waveform 28, the potential applied to the grid 72 of the tube 36 will shift in a direction to change the conductivity of the tube 36 in such a way as to correct this distortion. Size control is obtained in accordance with this invention by shifting the slider 74 along the resistor 32 of the potentiometer 33. If the potentiometer is adjusted so that the sliding contact is moved toward the resistor 31, the circuit is unbalanced toward the source which provides the waveform 28 which serves as a standard. In this position of the potentiometer slider a component of the sawtooth 28 is present along with such differential voltage as may exist at the slider 74, and the grid 72 experiences the application, not only of the differential correcting voltage, but the rising sawtooth voltage, and the tubes 12 and 36 deliver additional power to the deflection transformer 14 without impairing the waveform correcting effect of the tube 36. If the potentiometer slider is adjusted toward the resistor 43 then the sawtooth component, which is added, has the phase of the sawtooth 41. The output of the tube 36 will be degenerated with a resulting reduction in the size of the deflection current or voltage waveform and a resulting reduction in size of extent of the sweep. In a television receiver, there will be a resulting reduction in the size of the produced image.

Figures 2, 3:
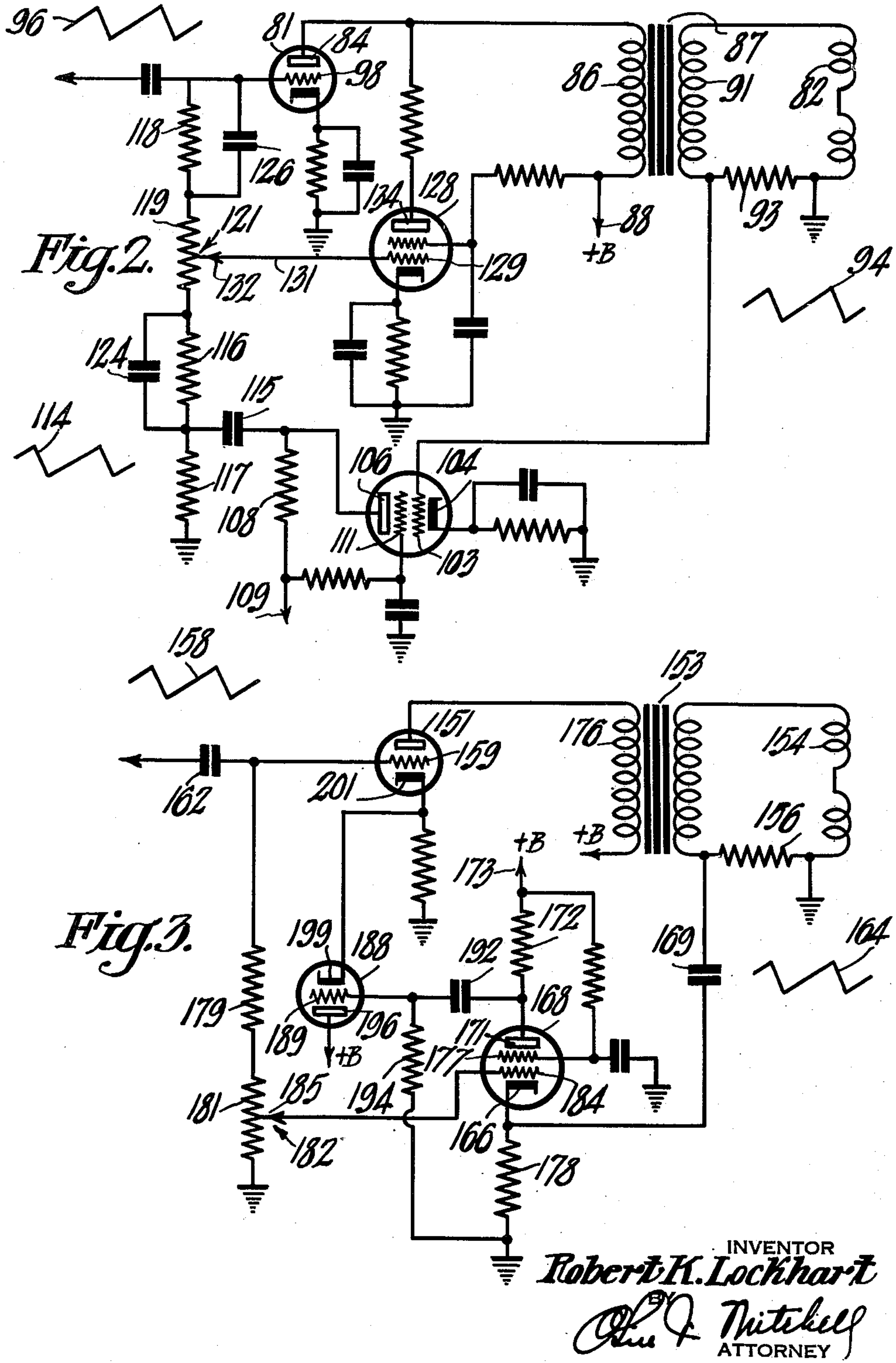
Fig. 2 is a diagrammatic showing of another embodiment of the invention.
Fig. 3 is a diagrammatic showing of a further embodiment of the invention.

Fig. 2 of the drawing discloses an embodiment of the invention employing an amplifier whereby to obtain a larger power output both for wave shape correcting and for size control. In this figure the power output tube 81 which serves to drive deflection currents through the yoke 82 is similar to the tube 12 of Fig. 1, and its anode 84 is connected through the primary 86 of a deflection transformer 87 to a suitable source (not shown) of high positive potential as indicated schematically at reference character 88. The secondary 91 of the transformer 87 is connected through a current conducting path to deflection coils 82. The connection to the yoke 82 includes a relatively small resistor 93 across which a comparison wave 94 is developed. This wave 94 is a voltage wave which is substantially a replica of the waveform of the deflection current and, therefore, contains any irregularities of departures of the deflection current wave from the desired waveform 96 which is supplied to the grid 98 of the tube 81. One end of the resistor 93 is connected to ground to provide a ground return for the control circuit and the remaining end is coupled through a connection 101 to the signal grid 103 of an amplifier tube 104. The anode 106 of the tube 104 is connected through a load resistor 108 to a source of positive potential (not shown) and indicated schematically at 109. It will be understood by those skilled in the art that connections 109 and 88 may be joined in a suitable manner. The tube 104, a tetrode type, for example, may include a screen grid 111 with suitable positive biasing connections as shown.

The amplified and inverted voltage wave 114 is coupled through a coupling condenser 115 to the junction points of resistors 116 and 117. It will be noted that the resistor 116 corresponds to the resistor 43 of Fig. 1. The resistor 117 is added in place of the yoke coils of Fig. 1 of the drawings.

The input wave 96 is applied through a resistor 118 to one terminal of the resistor 119 of a potentiometer 121. The resistors 116 and 118 are shunted by condensers 124 and 126 respectively for the purpose already explained in connection with Fig. 1 of the drawings.

The tube 128 functions in a manner similar to the tube of Fig. 1 of the drawings, and its signal grid 129 is coupled by a connection 131 to the slider 132 of the potentiometer 121. The anode 134 of the tube 128 is connected through a resistor 129 to the anode 84 of the tube 81. From the description given above in connection with Fig. 1 of the drawings, it is believed that the mode of operation in the arrangement of Fig. 2 of the drawings will be understood.

Fig. 3 discloses a modification of the invention in which the comparison signal is impressed in a novel manner on the cathode of the mixer tube. The cathode, being in phase with the grid, allows plate current to flow according to differences in the respective slopes of the original or standard signal and the comparison signal under conditions of balance. The balancing potentiometer is again so placed that the balance point is near the center of its range.

The output tube 151, the deflection transformer 153, the yoke coils 154 and the resistor 155 are associated together in the same way as those of Fig. 2, for example. The input signal 158, which is the original or standard signal, is coupled to the grid 159 of the tube 151 by a coupling condenser 162. The deflection waveform 164 is injected on or supplied to the cathode 166 of a mixer tube by way of a coupling condenser 169. The plate 171 of the tube 168 is connected through a resistor 172 to a suitable source of positive potential (not shown) as indicated by reference character 173. The primary 176 of the transformer 153 is also connected to the positive potential source so as to provide plate current for the tube 151. The screen grid 177 of the mixer tube is also connected by suitable means to point 173. The cathode 166 of the mixer tube is connected to a reference point in the circuit, such as ground, by a cathode resistor 178. The previously mentioned input signal 158 is supplied through a resistor 179 to one end of the resistor 181 of a potentiometer 182. As stated above, signal grid 184 of the mixer tube 168 are in phase with signals applied to the cathode of this tube. The signal grid 184 is connected to the slider 185. Therefore, the signal 158 and the signal 164 subtract in the plate current of the mixer tube giving rise to a differential signal represented by a change in plate current when there is a difference between the waveform 164 and 158.

A tube 188 receives the differential signal on its signal grid 189 by way of a coupling condenser 192. A grid resistor is provided for the signal grid 189. The plate 196 is connected, for example, to the same source of high positive potential as is indicated at reference character 173. The cathode 199 of the tube 188 is connected to the cathode 201 of the tube 151. The tube 188 functions as a cathode follower effective in parallel with the tube 151, which functions in the usual manner, and for conditions of unbalance, the operation of the system, with regard to the tube 188, is substantially the reverse of that obtained with the embodiments of Figs. 1 and 2 of the drawings. If the potentiometer 182 is adjusted toward the resistor 179, the sawtooth component will be such to drive the grid of this tube slightly more negative.

What is claimed is:

1. A system for maintaining a desired waveform of variable amplitude comprising an electric wave source, a utilization circuit for said wave coupled to said source, a wave comparison device, means for applying an electric wave from said wave source to one terminal of said comparison device, means for applying a wave from said utilization circuit to a second terminal of said comparison device in opposite phase relationship to the wave applied from said wave source and of substantially the same amplitude, said comparison device having means including a resistor connected between said two terminals for deriving a differential effect, and adjustable means for applying said differential effect to said utilization circuit to offset a departure in the waveform appearing in said utilization device from the waveform supplied by said electric wave source, said adjustable means serving to vary the amplitude of the waveform appearing in the utilization device.

2. A system for maintaining a desired waveform comprising an electric wave source, utilization apparatus operating under control of said wave, an electronic tube having at least a cathode, an anode and a control electrode, an anode circuit for said anode, means for coupling said anode circuit to said utilization device, means for impressing a wave from said source between said cathode and control electrode, a wave comparison device, means for applying an electric wave from said wave source to one terminal of said comparison device, means for applying a wave from said utilization apparatus to a second terminal of said comparison device in opposite phase relationship to the wave applied from said wave source and of substantially the same amplitude, said comparison device having means for deriving a differential effect, and adjustable means including a resistor connected between said two terminals for applying said differential effect to the anode circuit of said tube.

3. A system for maintaining a desired waveform comprising an electric wave source, a utilization circuit for said wave coupled to said source, a wave comparison device comprising an electronic tube, said tube having at least a cathode, an anode, and an electrode effective to control current flow through said tube, a resistance in the input circuit of said tube, means for applying an electric wave from said wave source to one end of said resistance, means for applying a wave from said utilization circuit to the other end of said resistance in opposite phase relationship to the wave applied from said wave source, a potentiometer connection to said resistance from said electrode, said tube supplying a differential effect upon a variation in waveform in said wave applied from said utilization circuit, and means for applying said differential effect to said utilization circuit, whereby said differential effect serves to supply any necessary amplitude change in the waveform applied to said utilization circuit.

4. In a deflection system for deflecting the cathode ray beam of a cathode ray tube having a sawtooth wave source, a deflection coil, a driver tube controlled by a wave from said source for driving a beam deflecting current through said coil, means for coupling said tube to said coil; a wave comparison device connected between said driver tube and said coil and comprising an electronic tube, a control electrode for said tube, means including a resistor for applying an electric wave from said sawtooth wave generator to said control electrode, a connection to said coil including a second resistor for applying a voltage wave representing the current wave in said coil to said control electrode in opposite phase relationship to the wave applied from said wave generator, a potentiometer between said resistors, an adjustable connection from said potentiometer to said control electrode, said comparison device having means for supplying a differential effect corresponding to a difference in amplitude between the waveform applied from said source to said driver tube and the waveform representing the current wave in said coil, and means for applying said differential effect to the output of said driver tube.

5. A system for maintaining a desired waveform comprising a first electronic tube having a cathode, anode and a control electrode, a utilization circuit coupled to said anode, means for supplying a sawtooth wave to said control electrode, a second electronic tube having a cathode, anode and a control electrode, means for supplying a voltage waveform from said utilization circuit to the cathode of said second tube, means to supply a sawtooth voltage waveform corresponding to said first named sawtooth wave to the control electrode of said second tube, a third electronic tube comprising a cathode, anode and a control electrode, said cathode of said third electronic tube being directly connected to the cathode of said first electronic tube, means for coupling the grid of said third electronic tube to the anode of said second electronic tube, and means for maintaining the output of said third electronic tube substantially constant in response to equal amplitudes of said input waveform and said waveform from said utilization circuit.

6. A system for maintaining a desired waveform of variable amplitude comprising a first electronic tube having a cathode, anode, and a control electrode, a utilization circuit coupled to said anode, means for supplying a sawtooth wave to said control electrode, a second electronic tube having a cathode, anode and a control electrode, means for supplying a voltage waveform from said utilization circuit to the cathode of said second tube, means including a potentiometer to supply a sawtooth voltage waveform corresponding to said first named sawtooth wave to the control electrode of said second tube, a third electronic tube comprising a cathode, anode and a control electrode, said cathode of said third electronic tube being connected to the cathode of said first electronic tube with substantially no impedance, means for coupling the grid of said third electronic tube to the anode of said second electronic tube, and means for maintaining the output of said third electronic tube substantially constant in response to equal amplitudes for said input waveform and said waveform from said utilization circuit.

7. A system for maintaining a desired waveform of variable amplitude comprising a first electronic tube having a cathode, anode and a control electrode, a utilization circuit coupled to said anode, means for supplying a sawtooth wave to said control electrode, a second electronic tube having a cathode, anode and a control electrode, means for supplying a voltage waveform from said utilization circuit to the cathode of said second tube, adjustable means to supply a sawtooth voltage waveform corresponding to said first named sawtooth wave from the control electrode of the first electronic tube to the control electrode of said second tube, a third electronic tube comprising a cathode, anode and a control electrode, said cathode of said third electronic tube being connected to the cathode of said first electronic tube and having a common cathode resistor, and means for coupling the grid of said third electronic tube to the anode of said second electronic tube.

8. A system as defined in claim 7 including means for maintaining the output of said third electronic tube substantially constant in response to equal amplitudes of said input waveform and said waveform from said utilization circuit.

ROBERT K. LOCKHART.

References Cited in the file of this patent

UNITED STATES PATENTS

| Number | Name | Date |
|---|---|---|
| 2,280,990 | White | Apr. 28, 1942 |
| 2,414,546 | Nagel | Jan. 21, 1947 |
| 2,423,362 | Banker | July 1, 1947 |
| 2,440,786 | Schade | May 4, 1948 |
| 2,466,537 | De Vore | Apr. 5, 1949 |
| 2,473,208 | Larsen | June 14, 1949 |
| 2,532,534 | Bell | Dec. 5, 1950 |